INVENTORS.
STANLEY H. BOUR
DONALD C. RIMLINGER
BY George J. Seligsohn
ATTORNEY

Sept. 5, 1967 S. H. BOUR ET AL 3,340,365

SIGNAL AMPLITUDE SEQUENCED TIME DIVISION MULTIPLEX COMMUNICATION SYSTEM

Filed June 28, 1965 2 Sheets-Sheet 2

United States Patent Office 3,340,365

Patented Sept. 5, 1967

3,340,365

SIGNAL AMPLITUDE SEQUENCED TIME DIVISION MULTIPLEX COMMUNICATION SYSTEM

Stanley H. Bour, East Rochester, and Donald C. Rimlinger, Holcomb, N.Y., assignors to Stromberg-Carlson Corporation, Rochester, N.Y., a corporation of Delaware Filed June 28, 1965, Ser. No. 467,386
5 Claims. (Cl. 179—15)

Figure 1A:
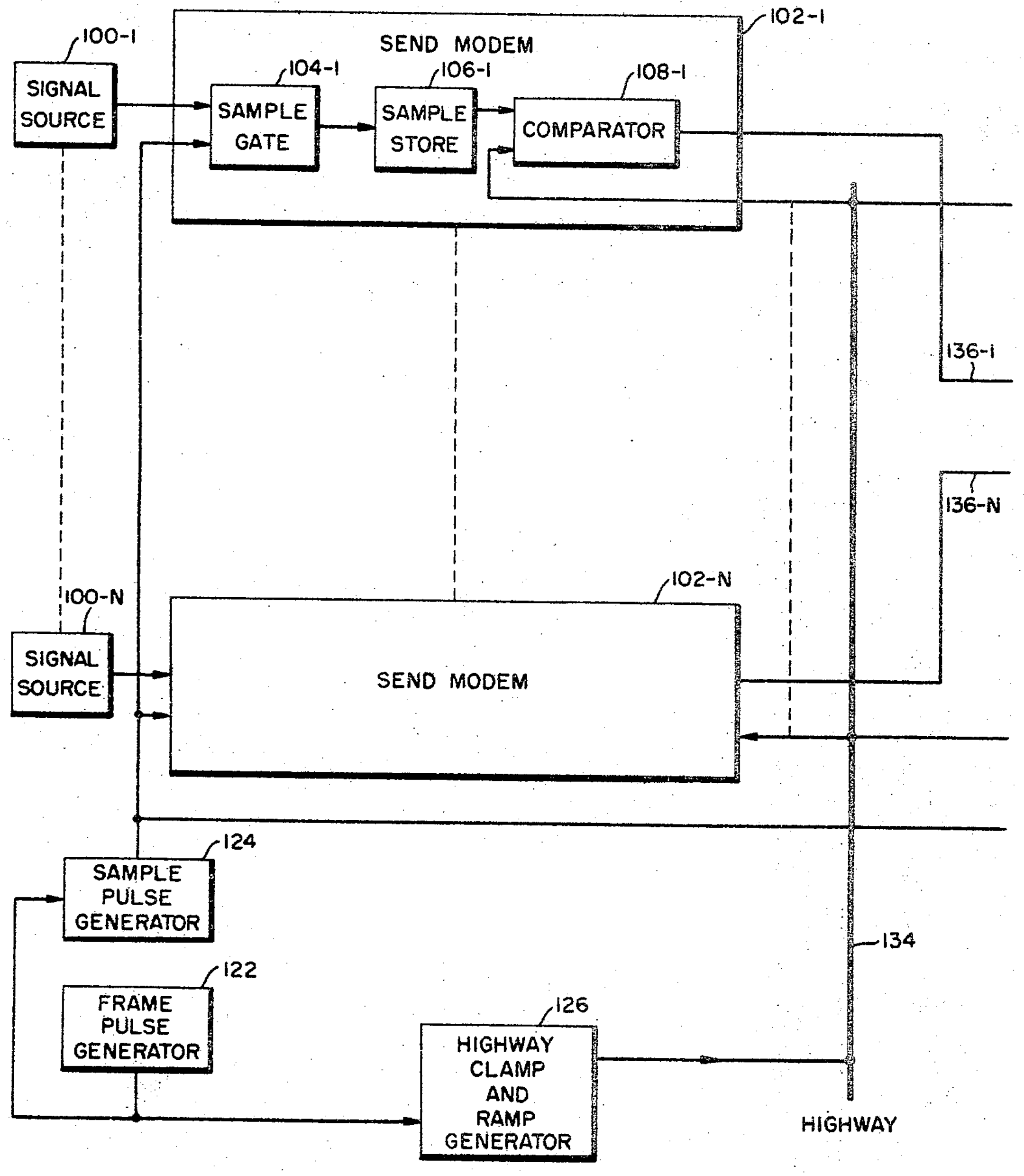

This invention relates to a time division multiplex communication system and, more particularly, to such a system which is signal amplitude sequenced, i.e., where the time of transmission of a signal sample during each repetitive time frame is determined by the instantaneous amplitude of the signal being sampled. The present invention is an improvement of the signal amplitude sequenced time division multiplex communication system disclosed in copending patent application Ser. No. 428,030, filed Jan. 26, 1965 by Stanley H. Bour and Barrie Brightman, and assigned to the same assignee as the present invention.

In a conventional time division multiplex communication system, a repetitive time frame is divided into a predetermined number of non-overlapping time slots. A different time slot is allotted to each one of a plurality of simultaneous independent communications carried over a common transmission highway. An individual, normally closed, send gate associated with each communication has its output coupled to a common transmission highway, and an individual, normally closed, receive gate associated with each communication has its input coupled to the common transmission highway. The pair of send and receive gates associated with each particular communication is opened only during the time slot allotted to that communication, whereby amplitude-modulated sample pulses of each communication are transmitted from various analog signal sources which are individually coupled to the inputs of the respective send gates to the outputs of the respective receive gates corresponding thereto. An individual low-pass filter having its input coupled to the output of each receive gate integrates the amplitude-modulated pulses applied thereto to thereby reproduce at the output of each low-pass filter the analog signal applied to the input of the send gate corresponding thereto.

It will be seen that during each successive time frame, amplitude-modulated pulses originating at each independent analog signal source are sequentially transmitted over the common transmission highway during the successive time slots composing each time frame. Since the common transmission highway unavoidably must have a certain reactance, it has been found that a small residual signal is stored by the common transmission highway at the end of each time slot which is proportional to the amplitude of the amplitude-modulated pulse sample occupying that time slot. These residual signals cause unwanted crosstalk to take place, since successive analog signals transmitted are independent of each other so that there is no relationship between the amplitude of an amplitude-modulated pulse sample transmitted during any one time slot and the amplitude of the amplitude-modulated pulse sample transmitted during the next succeeding time slot. If the time slots are relatively long, only a minor problem is created. However, when the duration of a time slot approaches one microsecond or less, the problem of crosstalk becomes very significant.

One method utilized by the prior art to minimize this unwanted crosstalk is to transmit each amplitude-modulated pulse sample only during a first portion of the time slot it occupies, utilizing the remaining latter portion of each time slot as a guard period. During each guard period, the common transmission highway is clamped to a point of fixed potential, such as ground. This permits substantially all of the residual signal then stored on the common transmission highway to be dissipated during that guard period, so that at the initiation of the next occurring sample any remaining residual signal from the previous sample is of negligible amplitude.

Since even the best of clamp circuits has a certain resistance which limits the discharge time constant of the common transmission highway, the guard period must have at least a certain minimum duration if clamping is to be effective in eliminating unwanted crosstalk. The fact that this is so limits the number of time slots into which a given time frame may be divided, thereby limiting the number of independent communications which may be transmitted over a common transmission highway.

On the other hand, one of the important advantages of a conventional time division multiplex communication system is that a simple and inexpensive low-pass filter may be employed in each receive modem, since the receive gate of each receive modem applies amplitude-modulated sample pulses thereto at a periodic fixed sampling repetition rate equal to the time frame frequency.

In a signal amplitude sequenced time division multiplex communication system, as opposed to a conventional time division multiplex communication system, the time of transmission over a common transmission highway of a signal sample during each repetitive time frame is determined by the instantaneous amplitude of the signal being sampled. More particularly, transmission takes place at that time during each successive time frame when the instantaneous amplitude of an analog signal being sampled is equal to or at least differs by a predetermined amount from the instantaneous amplitude of a periodic signal having a period equal to one time frame, each cycle of which preferably includes a linear ramp signal or at least includes a signal which is a single-valued function with respect to time and which has an amplitude range which is at least as great as the maximum amplitude range of any analog signal.

It will be seen that in a signal amplitude sequenced time division multiplex communication system it is unnecessary to clamp the common transmission highway following each sample transmission, since it is inherently immune to the problem of crosstalk. Therefore, no guard period is required and the number of independent communications which may be transmitted over a common transmission highway is limited solely by the maximum speed of operation of the logic elements employed therein, rather than the minimum duration of a needed guard period following each sample as in conventional time division multiplex communication systems.

Although signal amplitude sequenced time division multiplex communication systems significantly increase the number of communication channels which can be accommodated within a given period time frame, because the normally required guard time following each sampled transmission is eliminated, which is most advantageous, they still have not been utilized to any great extent. The reason for this is that in signal amplitude sequenced time division multiplex communication systems the respective time of occurrence of transmission of successive samples of any individual communication during successive time frames are aperiodic.

If each transmitted aperiodic sample, immediately upon receipt at a receive modem, is applied to the input of the low-pass filter thereof, spurious signals, in addition to the reproduced desired analog signal, will be produced within the passband of the filter of the output thereof.

These spurious signals represent a high level of noise, which in many cases cannot be tolerated. Since the low-pass filter of a conventional time division multiplex system sees a fixed periodic sampling repetition rate, which creates no spurious signals, such systems continue to be used despite the need for eliminating crosstalk and the consequent fewer communication channels which can be accommodated within a given period time frame.

This problem of aperiodicity is overcome in the signal amplitude sequenced time division multiplex communication system disclosed in the aforesaid copending patent application Serial No. 428,030 by making the low-pass filter of each receive modem see a periodic fixed sample repetition rate, rather than an aperiodic variable sample repetition rate. More particularly, this is accomplished by including at each receive modem in the system disclosed in the aforesaid copending patent application Ser. No. 428,030 two parallel sections interconnecting the common transmission highway with the input of the low-pass filter of that receive modem. Each of the two sections is composed of a sample store, a highway gate effective when enabled for applying samples from the common transmission highway to the store, and a readout gate effective when enabled for applying the stored sample to the input of the low-pass filter. The highway gate of one section and the readout gate of the other section are enabled during each odd time frame, while the highway gate of the other section and the readout gate of the one section are enabled during each even time frame. Therefore, regardless of when a sample is received during any time frame, it is not applied immediately to the input of the low-pass filter, but is applied only at the beginning of the next occurring time frame. Thus, successive samples of each communication will be applied to the input of the low-pass filter associated therewith at a periodic fixed repetition rate which is exactly equal to the time frame frequency. Although the two parallel sections interconnecting the common transmission highway with the input of the low-pass filter of each receive modem operate well, an inordinate amount of circuitry in each receive modem is required.

It is therefore an object of the present invention to provide a signal amplitude sequenced time division multiplex communication system wherein the low-pass filter of each receive modem sees a periodic fixed repetition rate, rather than an aperiodic fixed repetition rate, and yet requires a substantially reduced amount of circuitry than heretofore was found necessary.

Briefly, this is accomplished in the present invention by providing serial operation, rather than parallel operation, at each receive modem. More particularly, in the present invention, each receive modem includes a single section interconnecting the common transmission highway with the input of the low-pass filter of that receive modem. This single section is composed of a first sample store, a highway gate effective when enabled for applying samples from the common transmission highway to this first sample store, a second sample store, a readout gate effective when enabled for transferring the stored sample in the first sample store to the second sample store, and the low-pass filter of the receive modem which has its input directly coupled to the output of the second sample store. The highway gate is normally open or enabled, while the readout gate is normally closed or disabled. Each receive modem further includes a flip-flop which closes or inhibits the highway gate of each receive modem for the remaining portion of a time frame after a sample is received thereby. The readout gate of each receive modem is opened only at the beginning of each time frame to permit the transfer of the sample stored during the previous time frame in the first sample store to the second sample store. Thus, successive samples of each communication will be applied to the input of the low-pass filter associated therewith at a periodic fixed repetition rate which is exactly equal to the time frame frequency.

Figure 1C:
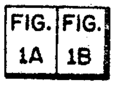
Figure 1B:
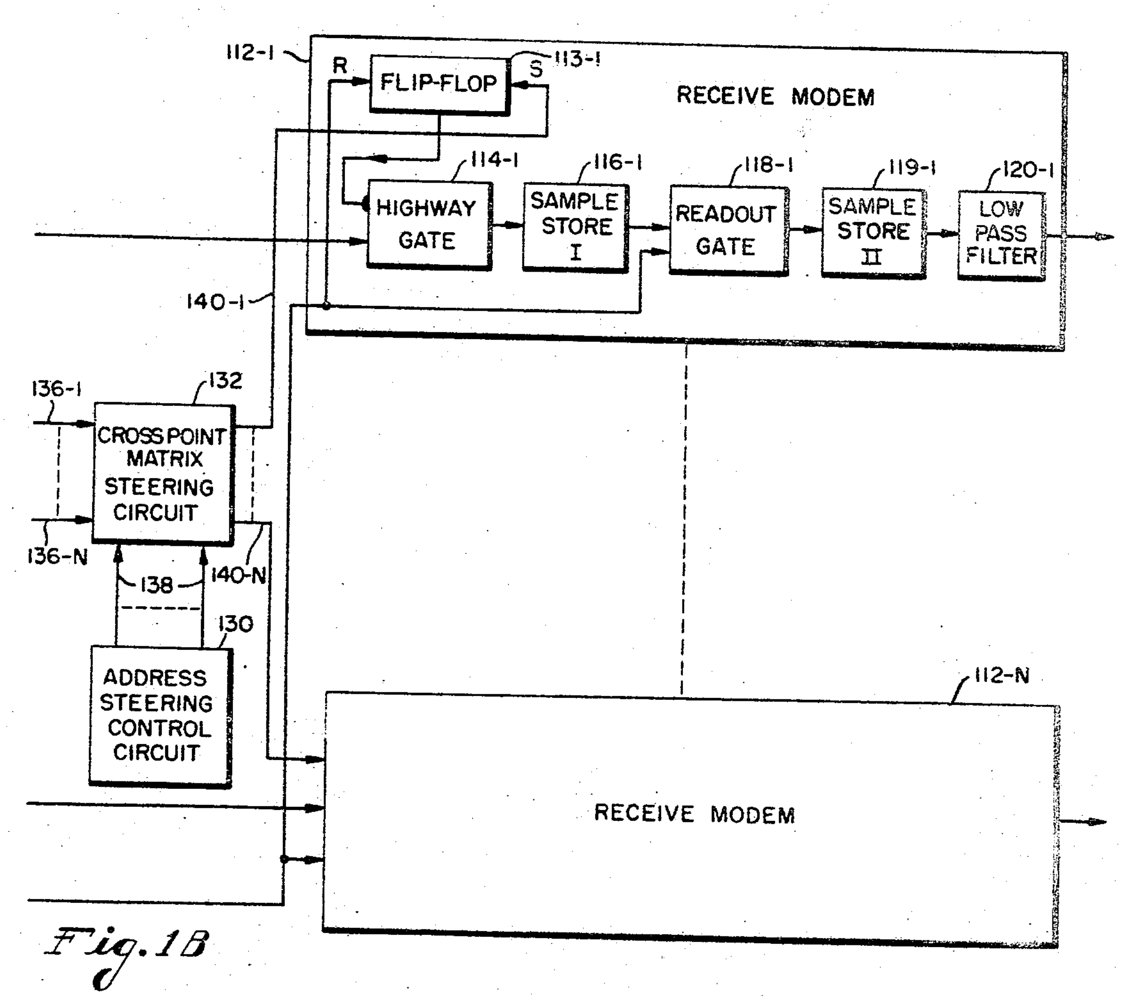
Figure 2:
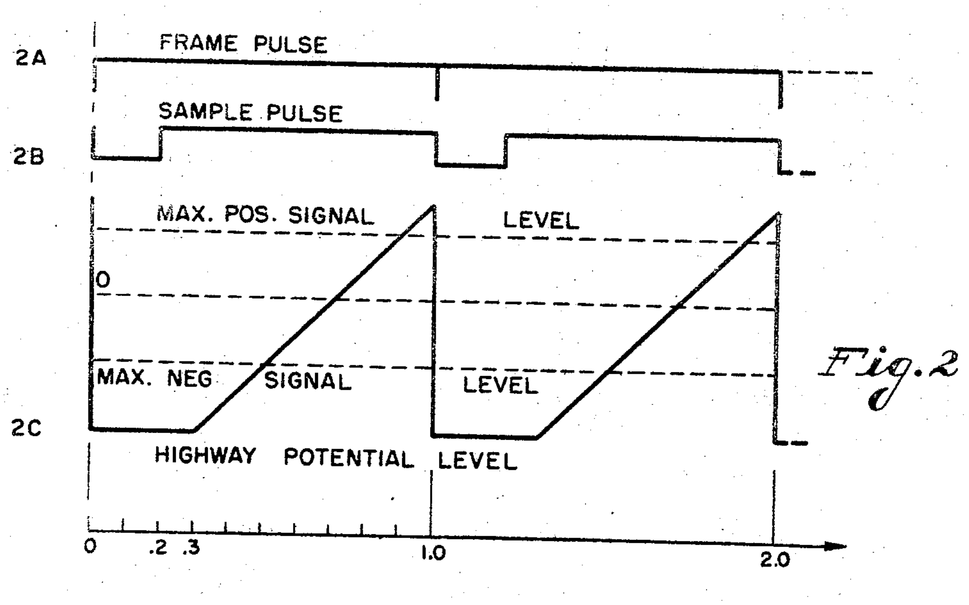

This and other objects, features and advantages in the invention will become more apparent when taken together with the accompanying drawings, in which:

FIGS. 1A and 1B, when combined as shown in FIG. 1C, illustrate a block diagram of the preferred embodiment of the invention; and FIG. 2 provides a timing chart showing the waveform and time of occurrence of various control signals employed in the embodiment shown in FIGS. 1A and 1B.

Referring now to the embodiment illustrated in FIGS. 1A and 1B, there is shown a group of independent signal sources 100–1 . . . 100–N, each of which produces an analog signal, the instantaneous amplitude of which is always between a predetermined maximum negative signal level and a maximum positive signal level.

Individually associated with each of signal sources 100–1 . . . 100–N is a corresponding one of a group of identical send modems 102–1 . . . 102–N. Each send modem includes a sample gate, a sample store, and a comparator, such as the sample gate 104–1, sample store 106–1, and comparator 108–1 of send modem 102–1.

Corresponding with each of send modems 102–1 . . . 102–N is a group of identical receive modems 112–1 . . . 112–N. Each receive modem includes an input amplifier, a low-pass filter, and an output amplifier, such as input amplifier 114–1, low-pass filter 120–1, and output amplifier 116–1 of receive modem 112–1. Each output amplifier, such as output amplifier 116–1, provides a balanced output therefrom. Each low-pass filter, such as low-pass filter 120–1, has a cutoff frequency which is greater than the highest transmitted frequency component of any analog signal and less than the frame frequency.

The embodiment illustrated in FIGS. 1A and 1B further includes common equipment comprising frame pulse generator 122, sample pulse generator 124, highway clamp and ramp generator 126, address steering control circuit 130, crosspoint matrix steering circuit 132, and common transmission highway 134.

Frame pulse generator 122 generates sharp frame pulses, shown in graph 2A of FIG. 2, at a predetermined fixed pulse repetition rate, such as 10,000 cycles per second, which is greater than twice the highest frequency component of any analog signal to be transmitted.

As shown, the frame pulses from frame pulse generator 122 are applied as an input to sample pulse generator 124. Sample pulse generator 124, which may be a monostable multivibrator which is set in response to each frame pulse and which automatically resets a predetermined time interval thereafter, produces a sample pulse in response to each frame pulse. Each sample pulse, as shown in graph 2B of FIG. 2, may have, for example, a pulse width equal to 0.2 of a frame period.

As shown, frame pulses from frame pulse generator 122 are also applied as an input to highway clamp and ramp generator 126. Highway clamp and ramp generator 126 may include a ramp generator and a monostable multivibrator which is set in response to each frame pulse and which automatically resets a fixed time interval thereafter, which fixed time interval is at least as long as the sample pulse width, but is preferably longer than the sample pulse width. This monostable multivibrator, when in its set condition, is effective in disabling the ramp generator and in applying to the output of the highway clamp and ramp generator 126 a fixed predetermined potential clamp level of a given polarity which has an absolute magnitude greater than the maximum signal level of that given polarity of any analog signal. After the monostable multivibrator resets, the ramp generator thereof is enabled to provide a ramp waveform output, which is preferably linear, from highway clamp and ramp generator 126. The ramp waveform output must be of such magnitude that during the remainder of each frame period, the instantaneous potential level of the output of highway clamp and ramp generator 126 changes from the aforesaid clamp potential level to a potential level of a polarity opposite to the aforesaid given polarity which is greater than the maximum signal level of a polarity opposite to the aforesaid given polarity of any analog signal. As shown in graph 2C of FIG. 2, the output of highway clamp and ramp generator 126 may be clamped to a negative potential level which is greater than the maximum negative signal level of any analog signal for a time interval equal to 0.3 of a frame period and then rise linearly during the remainder of the frame period to a positive level which is greater than the maximum positive signal level of any analog signal.

The output of each of signal sources 100–1 . . . 100–N is applied as a first input to the sample gate of its corresponding send modem. For instance, in the case of send modem 102–1, the analog signal from signal source 100–1 is applied as a first input to sample gate 104–1 of send modem 102–1.

As shown, each sample pulse emanating from sample pulse generator 124 is applied in common as a second input to all the sample gates of all the send modems. For instance, in the case of send modem 102–1, each sample pulse emanating from sample pulse generator 124 is applied as a second input to sample gate 104–1 of send modem 102–1. Each of the sample gates, such as sample gate 104–1 of send modem 102–1, is normally closed and is opened only during the presence of a sample pulse from sample pulse generator 124–1. Therefore, all of the independent analog signals from signal sources 100–1 . . . 100–N will be simultaneously sampled during the existence of each sample pulse once during each time frame; i.e., in the particular case illustrated in FIG. 2, the analog signal from each signal source 100–1 . . . 100–N will be sampled during the first 0.2 of each time frame.

The sample of each send modem is applied as an input to the sample store thereof. For instance, in the case of send modem 102–1, the sample appearing at the output of sample gate 104–1 is applied as an input to sample store 106–1. Each of the sample stores may include an emitter follower feeding a capacitance load, the capacitance load being charged to the potential level proportional to the sample level in response to each sample.

The potential level of the capacitance load of the sample store of each send modem is applied as a first input to the comparator thereof. For instance, in the case of send modem 102–1, the potential level of the capacitance load of sample store 106–1 is applied as a first input to comparator 108–1.

The output of highway clamp and ramp generator 126, which may have the waveform shown in graph 2C of FIG. 2, is applied, as shown, to common transmission highway 134. Therefore, the instantaneous potential level of common transmission highway 134 will follow this waveform. As shown, the potential level appearing on common transmission highway 134 is applied in common as a second input to the comparator of each send modem. For instance, in the case of send modem 102–1, the potential level appearing on common transmission highway 134 is applied as a second input to comparator 108–1. Each of the comparators, such as comparator 108–1 of send modem 102–1, produces an output pulse in response to the sample potential level applied as a first input thereto and the highway potential level applied as a second input thereto becoming equal, or at least differing from each other by a predetermined amount.

Each of the comparators, such as comparator 108–1 of send modem 102–1, may consist of a differential amplifier which produces a momentary output pulse only when the second input applied thereto becomes equal in level to the first input applied thereto. Since, as shown in graphs 2B and 2C of FIG. 2, the length of the clamp period of the highway potential level, namely, 0.3 of a time frame period, is longer than the length of the sample pulse period, namely, 0.2 of a time frame period, it is assured that under all signal level conditions the application of a sample to the sample store of a send modem by the sample gate thereof will be completed and the sample gate thereof completely closed prior to the instant at which the lagging edge of the output pulse from the comparator thereof is produced in response to equality being achieved between the potential levels applied to the first and second inputs thereof.

Common transmission highway 134 is also connected in common as a first input to the normally open highway gate of each receive modem, such as highway gate 114–1 of receive modem 112–1. Therefore, the ramp signal on the common transmission highway is forwarded by the highway gate, such as highway gate 114–1 of receive modem 112–1, of each receive modem to the first sample store of each receive modem, such as first sample store 116–1 of receive modem 112–1. The first sample store of each of the receive modems, such as first sample store 116–1 of receive modem 112–1, may consist of a capacitance load which is charged through an emitter follower coupled to the output of the highway gate with which that first sample store corresponds. Therefore, as long as the highway gate of a receive modem, such as highway gate 114–1 of receive modem 112–1, is open, the instantaneous potential level to which the capacitance load of the first sample store which corresponds thereto is charged will follow the instantaneous potential level of the waveform on common transmission highway 134, shown in graph 2C of FIG. 2.

The output pulse produced by the comparator of each send modem, such as comparator 108–1 of send modem 102–1, is applied as an individual input to crosspoint matrix steering circuit 132, over separate input conductors 136–1 . . . 136–N, as shown. Crosspoint matrix steering circuit 132, in accordance with address information supplied thereto over conductors 138 from address steering control circuit 130, interconnects each individual one of input conductors 136–1 . . . 136–N to that separate predetermined one of output conductors 140–1 . . . 140–N is selected in accordance with this address information. Each of output conductors 140–1 . . . 140–N is individually coupled as a set input to the flip-flop of each of receive modems 112–1 . . . 112–N, such as flip-flop 113–1 of receive modem 112–1. In response to the flip-flop of each receive modem, such as flip-flop 113–1 of receive modem 112–1, being set, an inhibit output is applied therefrom to the highway gate, such as highway gate 114–1 of receive modem 112–1, of that receive modem to effect the closure thereof. This results in the termination of any further charging of the capacitance of the first sample store, such as first sample store 113–1 of receive modem 112–1, of the receive modem which corresponds therewith. Therefore, after the highway gate, such as highway gate 114–1 of receive modem 112–1, of any receive modem is closed, the capacitance of the first samples tore which corresponds therewith will remain charged to a potential level which is proportional to that of the sample which has been communicated thereto.

The output of the first sample store of each receive modem, such as first sample store 116–1 of receive modem 112–1, is applied, as shown as a first input to the normally closed readout gate of that receive modem, such as readout gate 118–1 of receive modem 112–1.

As shown, the sample pulse from sample pulse generator 124 is also applied in common as a reset input to the flip-flop of each receive modem, such as flip-flop 113–1 of receive modem 112–1, and as a second input to the readout gate of each receive modem, such as readout gate 118–1 of receive modem 112–1, to effect the opening thereof for the duration of each sample pulse, shown in graph 2B of FIG. 2. The flip-flop of each receive modem, such as flip-flop 113–1 of receive modem 112–1, is constructed to be reset only in response to the occurrence of the lagging edge of each sample pulse applied as a reset input thereto from sample pulse generator 124. Therefore, during each time frame upon the termination of each sample pulse, the highway gate of each receive modem, such as highway gate 114–1 of receive modem 112–1, is reopened, ready to forward the next sample to the first sample store thereof. However, since the readout gate of each receive modem, such as readout gate 118–1 of receive modem 112–1, remains open only during the occurrence of each sample pulse from sample pulse generator 124, the sample stored in the first sample store of each receive modem, such as first sample store 116–1 of receive modem 112–1, during the immediately preceding time frame is transferred to the second sample store of that receive modem, such as second sample store 119–1 of receive modem 112–1, prior to the reopening of the highway gate of that receive modem. The second sample store of each receive modem, such as second sample store 119–1 of receive modem 112–1, may simply be a capacitance. Thus a sample applied to any receive modem from the signal source with which it is in communication during any time frame is stored in the second sample store thereof during the next occurring time frame, while the next occurring sample is being applied to the first sample store thereof. During this next occurring time frame, the sample stored in the second sample store of each receive modem, such as second sample store 119–1 of receive modem 112–1, is applied, as shown, as an input to the low-pass filter of that receive modem, such as low-pass filter 120–1 of receive modem 112–1.

The low-pass filter of each receive modem, such as low-pass filter 120–1 of receive modem 112–1, serves to integrate the successive samples applied thereto and thereby provide at its output a signal which is a faithful reproduction of the input signal from the signal source with which it is in communication.

It will be seen from the foregoing that the low-pass filter of each receive modem, such as low-pass filter 120–1 of receive modem 112–1, has an input applied thereto which occurs at a fixed periodic repetition rate exactly equal to the time frame frequency. Therefore, no unwanted spurious signals in the passband of the low-pass filter are created at its output.

Although only a preferred embodiment of the present invention has been described herein, it is not intended that the invention be restricted thereto, but that it be limited solely by the true spirit and scope of the appended claims.

What is claimed is:

1. In a time division multiplex communication system for transmitting an analog signal from an individual originating point corresponding therewith to a preselected terminating point corresponding thereto, said system comprising a source of analog signal coupled to said originating point, a periodic signal source for producing a periodic signal having a fundamental frequency which is greater than twice as high as the highest frequency component of said analog signal to be transmitted, said periodic signal source including waveform means for producing as an output during each cycle of said periodic signal a predetermined single-valued function with respect to time which has an amplitude range which is at least as great as the maximum amplitude range of said analog signal, first and second receive sample stores, sampling means coupled to said originating point and said periodic signal source for sampling the instantaneous amplitude of said analog signal once during each cycle of said periodic signal and for transmitting each sample to said first receive sample store when a predetermined amplitude difference occurs between the sampled amplitude of said analog signal during that cycle and the instantaneous amplitude of said single-valued function, transfer means for transferring the sample stored by said first receive sample store during each cycle of said periodic signal to said second receive sample store only at the beginning of the next-occurring cycle of said periodic signal, a low-pass filter having a cutoff frequency which is greater than said highest frequency component of said analog signal and less than said fundamental frequency of said periodic signal, first coupling means for applying the output of said second receive sample store as an input to said filter, and second coupling means for applying the output of said filter to said preselected terminating point.

2. The system defined in claim 1, wherein said predetermined amplitude difference is zero.

3. The system defined in claim 1, wherein said single-valued function is a linear ramp.

4. The system defined in claim 1, wherein said waveform means produces an output a clamp level of a given polarity and a given amplitude which is greater than the maximum amplitude of that given polarity of said analog signal for a first minor portion of each cycle of said periodic signal occurring at the beginning thereof, said waveform means producing said single-valued function for the remaining portion of each cycle of said periodic signal, and wherein said sampling means includes a send sample store, a normally closed send sample gate coupling said originating point to said send sample store which when open is effective in applying a sample of said analog signal to said send sample store, means coupled to said periodic signal source for opening said send sample gate for a second minor portion of each cycle of said periodic signal at the beginning thereof, said first minor portion being at least as long as said second minor portion, a comparator responsive to first and second inputs applied thereto for producing an output pulse whenever the respective amplitudes of said first and second inputs thereto are equal to each other, means for applying the stored sample from said send sample store as said first input to said comparator, and means for applying the output of said waveform means as said second input to said comparator.

5. The system defined in claim 4, wherein said transfer means includes a normally closed gate coupling the output of said first receive sample store to the input of said second receive sample store and means for opening said normally closed gate of said transfer means for a third minor portion of each cycle of said periodic signal occurring at the beginning thereof, said first minor portion being at least as long as said third minor portion, and wherein said sampling means further includes a receive gate coupling said waveform means to said first receive sample store which when open is effective in applying the output of said waveform means to said first receive sample store, and control means for opening said receive gate in response to the end of said third minor portion of each cycle of said periodic signal and for closing said receive gate in response to said output pulse from said comparator.

References Cited

UNITED STATES PATENTS 3,158,691 11/1964 Brightman ---------- 179—15

JOHN W. CALDWELL, *Acting Primary Examiner.*

ROBERT L. GRIFFIN, *Examiner.*